Patented Feb. 21, 1933

1,898,861

UNITED STATES PATENT OFFICE

SAMUEL von ALLMEN, OF BASEL, SWITZERLAND, ASSIGNOR TO FIRM "CHEMICAL WORKS FORMERLY SANDOZ", OF BASEL, SWITZERLAND

MANUFACTURE OF DYESTUFFS OF THE ANTHRAQUINONE SERIES

No Drawing. Application filed July 8, 1930, Serial No. 466,610, and in Germany July 12, 1929.

My invention relates to a process for the manufacture of new dyestuffs of the anthraquinone series, which consists in condensing anthraquinone derivatives of the general formula:

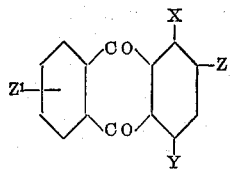

wherein X represents an amino, substituted amino, hydroxy or alkoxy group, Y represents a group which can be replaced by an arylaminoresidue, and Z and $Z^1$ represent a hydrogen, a halogen or a sulphonic group, with aromatic amines containing at least one halogen atom in m-position to the amino group and preferably subjecting the compounds thus obtained to a sulphonating operation.

This process is in so far of great value for the important class of the alphylidoanthraquinone dyestuffs as the derivatives which contain in the alphylidorest a halogen atom in meta position to the imido nitrogen possess the unexpected property of giving much redder shades.

Thus for instance the sulphonic acid of 1-amino-2-methyl-4 - m - chloranilidoanthraquinone dyes unmordanted wool violet shades, whereas the respective anilido-, p-toluido-, o-toluido-, m-toluido or p-chloranilidoderivatives give blue or violet-blue shades. The sulphonic acid of 1-hydroxy-4-m-chloranilidoanthraquinone yields red-violet tints, whereas the respective p-toluidoderivative dyes wool blue-violet shades.

The following examples illustrate the invention, the parts being by weight.

Example 1

10 parts of 1-amino-2-methyl-4-bromanthraquinone, 40 parts of m-chloraniline, 4 parts of anhydrous potassium acetate and 0.1 part of copper sulphate are heated under good stirring at 160° C. until a test dissolved in benzene does no more show any change in the coloration. On addition of alcohol the thus produced dyestuff base is precipitated in form of fine crystal leaflets, which are soluble in benzene with a violet and in concentrated sulphuric acid with a red-violet coloration. The purified base melts at 276° C. By sulphonating the base, an easily water soluble dyestuff is obtained, which dyes wool from an acid bath pure violet tints of an excellent fastness to light. This dyestuff is also very suitable for wool printing. By introducing a second sulphonic group in the halogenated alphylido residue a much redder dyestuff is obtained.

Example 2

10 parts of 1-amino-4-hydroxyanthraquinone, 20 parts of m-chloraniline, 60 parts of alcohol and 10 parts of hydrosulphite are heated under the reflux condenser in an indifferent atmosphere until the formation of the dyestuff base is finished. By sulphonating the base thus produced a dyestuff is obtained which dyes wool violet-red tints.

Example 3

10 parts of 1-hydroxy-2-4-dibromanthraquinone, 4 parts of potassium acetate, 40 parts of m-chloraniline and 0.1 part of copper sulphate are heated at a temperature of 150–170° C. until the condensation is finished; thereupon the obtained dyestuff base is precipitated by means of alcohol.

By treating the base thus obtained with sulphite, the p-halogenatom is replaced by a sulphonic group, yielding an easily water soluble dyestuff which dyes wool from an acid bath pure violet shades.

Example 4

If the 1-hydroxy-2-4-dibromanthraquinone used in the Example 3 is replaced by 1-amino-2-4-dibromanthraquinone, a dyestuff base is obtained which on sulphonation with oleum yields a dyestuff dyeing wool reddish blue shades.

Example 5

10 parts of the dyestuff base obtained according to the Example 4 are heated with 20 parts by volume of a 38 per cent aqueous potassium sulphite solution and 40 parts of phenol until complete solubilization of the base has occurred. The phenol is then blown off by steam and the dyestuff is precipitated by salting out, filtered off and dried. The thus obtained dyestuff dyes wool violet-blue tints which do not change in the artificial light.

Example 6

23 parts of the potassium salt of 1-amino-2-4-dibrom-5-anthraquinonesulphonic acid are heated under the reflux condenser with 250 parts of water, 16 parts of m-chlor-aniline, 6 parts of sodium carbonate and 1, 5 parts of crystallized copper sulphate, until the condensation is finished. On addition of acid to the reaction mass, the obtained condensation product is precipitated. By further treating same with potassium sulphite and phenol according to the Example 5, the bromine atom in the $\beta$-position is replaced by a sulphonic group yielding a dyestuff which dyes wool very beautiful and fast reddish-blue shades. Owing to its very good solubility it may successfully be used for wool printing.

In the examples mentioned above the m-chloraniline can be replaced by other m-halogen substituted aromatic amines. In general, if the aromatic amines which have been used up to now for the preparation of alphylidoanthraquinone sulphonic acids are replaced by their derivatives having at least one m-position to the amino-group substituted by a halogen atom, the dyestuff bases obtained yield after sulphonation very useful dyestuffs of a much redder shade.

The dyestuffs and their bases obtained according to the above described process possess the following reactions:

Table I

| Dyestuff base of the formula | In dry form | Solution in | | | | |
| --- | --- | --- | --- | --- | --- | --- |
| | | Conc. $H_2SO_4$ | Conc. $H_2SO_4$ + $B(OH)_3$ | Alcohol | Acetic acid | Benzene |
| (structure with $NH_2$, $CO$, $CH_3$, $CO$, $NH$–phenyl–$Cl$)<br>Prepared according to the Example 1 | Beautiful leaflets | Violet-red | Red-violet, fluorescence red | Insoluble in cold alcohol<br>Violet-blue in warm alcohol | Violet-blue | Violet |
| (structure with $OH$, $CO$, $CO$, $NH$–phenyl–$Cl$)<br>Prepared according to the Example 2 | Dark violet needles | Dull blue-green | Violet | Violet-red in warm alcohol | Violet-red | Red-violet |
| (structure with $OH$, $CO$, $Br$, $CO$, $NH$–phenyl–$Cl$)<br>Prepared according to the Example 3 | Very fine violet crystals | Green-brown | Blue-violet | Insoluble in cold alcohol<br>Violet in warm alcohol | Violet-red | Violet |

*Table I*—Continued

| Dyestuff base of formula | In dry form | Solution in | | | | |
|---|---|---|---|---|---|---|
| | | Conc. $H_2SO_4$ | Conc. $H_2SO_4$ +$B(OH)_3$ | Alcohol | Acetic acid | Benzene |
| 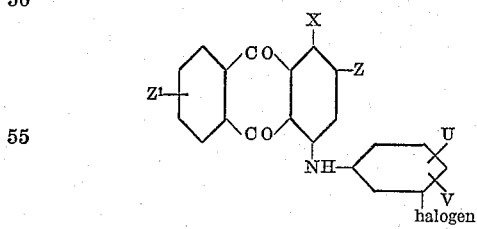<br>Prepared according to the Example 4 | Little dark blue crystals | Dull blue | Violet, red fluorescence | Insoluble in cold alcohol<br>Pale violet-blue in warm alcohol | Violet-blue | Violet-blue |
| 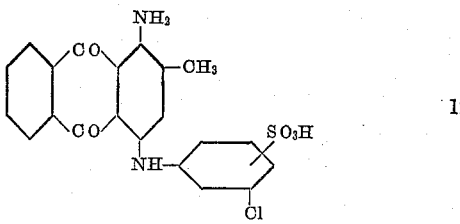<br>Prepared according to the Example 6 | Very fine dark blue crystals | Nearly colorless | Violet-grey | Insoluble in cold alcohol, violet-blue in warm alcohol | Greenish blue | Insoluble |

*Table II*

| Dyestuff | In dry form | Solution in | | | | |
|---|---|---|---|---|---|---|
| | | Water | Water under addition of ClH | $SO_4H_2$ | $SO_4H_2$ under addition of boric acid | Alcohol |
| Prepared according to Example 1 | Dark blue powder | Violet | Orange | Violet | Red-violet, red fluorescence | Violet |
| Prepared according to Example 2 | Dark blue powder | Violet-red | Violet-red | Violet-blue | Violet, red fluorescence | Red-violet |
| Prepared according to Example 3 | Dark blue powder | Violet-blue | Blue flocs | Pale yellow-green | Green-blue | Blue |
| Prepared according to Example 4 | Blue-grey powder | Violet | Dull reddish | Dull violet | Blue, red fluorescence | Violet |
| Prepared according to Example 5 | Violet-blue powder | Blue | Violet precipitate | Pale blue-grey | Blue-green | Blue |
| Prepared according to Example 6 | Dark-blue powder | Blue | Rose | Greyish, after a moment red | Dull blue-green | Blue |

What I claim is:—

1. The dyestuffs of the anthraquinone series of the general formula:

wherein X represents an amino or hydroxy group, Z and $Z^1$ represent a hydrogen, a halogen or a sulphonic group, U represents a hydrogen or a sulphonic group, and V represents a hydrogen or a sulphonic group, which dyestuffs constitute in dry state dark blue powders, soluble in water with blue to violet coloration, yielding on animal fibres fast dyeings of reddish-blue to red-violet shades.

2. The dyestuff of the anthraquinone series of the formula:

which is in dry state a dark blue powder, easily soluble in water with a violet coloration, soluble in concentrated sulphuric acid with a violet coloration, which becomes red-violet with a red fluorescence on addition of boric acid and which dyes unmordanted wool pure violet tints of excellent fastness to light.

3. The dyestuff of the anthraquinone series of the formula:

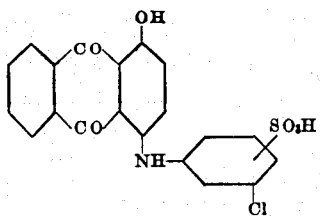

which is in dry state a dark violet powder, easily soluble in water with a red-violet coloration, becoming blue violet on addition of sodium hydroxide, soluble in concentrated sulphuric acid with a blue violet coloration, which becomes red-violet on addition of boric acid and which dyes unmordanted wool pure red-violet tints.

4. The dyestuff of the anthraquinone series of the formula:

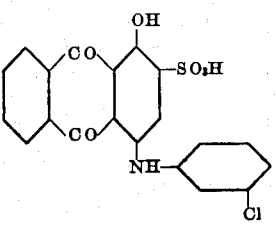

which is in dry state a dark-blue-violet powder, soluble in hot water with a violet coloration, which becomes blue-green on addition of sodium hydroxide, soluble in concentrated sulphuric acid with a yellow-green coloration, which becomes greenish-blue on addition of boric acid and which dyes unmordanted wool blue-violet tints of excellent fastness to washing and acids.

In witness whereof I have hereunto signed my name this 25th day of June 1930.

SAMUEL von ALLMEN.